United States Patent
Schwefer et al.

(10) Patent No.: US 7,259,121 B2
(45) Date of Patent: *Aug. 21, 2007

(54) METHOD OF REDUCING THE $N_2O$ CONTENT OF GASES AND SELECTED CATALYSTS

(75) Inventors: Meinhard Schwefer, Meschede (DE); Joachim Motz, Kelkheim (DE); Carsten Gehlen, Marl (DE)

(73) Assignee: UHDE GmbH, Dortmund (DE)

(*) Notice: Subject to any disclaimer, the term of this patent is extended or adjusted under 35 U.S.C. 154(b) by 337 days.

This patent is subject to a terminal disclaimer.

(21) Appl. No.: 10/469,439

(22) PCT Filed: Mar. 6, 2002

(86) PCT No.: PCT/EP02/02436

§ 371 (c)(1),
(2), (4) Date: Jan. 14, 2004

(87) PCT Pub. No.: WO02/072244

PCT Pub. Date: Sep. 19, 2002

(65) Prior Publication Data

US 2004/0110627 A1    Jun. 10, 2004

(30) Foreign Application Priority Data

Mar. 13, 2001 (DE) .............................. 101 12 396

(51) Int. Cl.
*B01D 53/56* (2006.01)
*B01D 53/86* (2006.01)
*B01J 29/064* (2006.01)
*B01J 29/46* (2006.01)
*B01J 29/68* (2006.01)

(52) U.S. Cl. .................. 502/74; 502/77; 502/86; 423/239.1; 423/239.2

(58) Field of Classification Search .............. 502/74, 502/77, 86; 423/239.1, 239.2
See application file for complete search history.

(56) References Cited

U.S. PATENT DOCUMENTS

| | | | |
|---|---|---|---|
| 5,019,543 A | * | 5/1991 | Davis et al. .............. 502/64 |
| 5,384,296 A | * | 1/1995 | Tsao ........................ 502/66 |
| 5,482,692 A | | 1/1996 | Audeh et al. ............ 423/239.2 |
| 5,672,777 A | | 9/1997 | Kharitonov et al. ........ 568/800 |
| 6,482,313 B1 | * | 11/2002 | Schuette et al. ....... 208/120.01 |
| 6,689,709 B1 | * | 2/2004 | Tran et al. .................. 502/65 |

FOREIGN PATENT DOCUMENTS

| EP | 0 541 008 | 5/1993 |
|---|---|---|
| EP | 0 955 080 | 11/1999 |

OTHER PUBLICATIONS

Hiemer et al., Chemie Ingenieur Technik, vol. 74, 2002, pp. 552-553.
Consuelo Montes de Correa et al., "Decomposition of nitrous oxide in excess oxygen over Co- and Cu-exchanged MFI zeolites," Catalysis Letters 38:27-32, XP-002213225 (1996).
M. Kogel et al., "Simultaneous catalytic removal of NO and N2O using Fe-MFI", Journal of Catalysis 182:470-478, XP-000996158 (1999).
M. Rauscher et al., "Preparation of a highly active Fe-ZSM-5 catalyst through solid-state ion exchange for the catalytic decomposition of N2)", Applied Catalysis A: General 184:249-256 (1999).
A. Ribera et al., Preparation, Characterization, and Performance of FeZSM-5 for the Selective Oxidation of Benzene to Phenol with N2O, Journal of Catalysis 195:287-297, XP-002213224 (2000).

* cited by examiner

*Primary Examiner*—David Sample
(74) *Attorney, Agent, or Firm*—Connolly Bove Lodge & Hutz LLP

(57) ABSTRACT

A method of reducing the $N_2O$ content in gases is described. A selected zeolite catalyst is used in the method. This catalyst is present in the H form and/or contains exchanged iron and is characterized by the presence of nonlattice aluminum in addition to the lattice aluminum in a molar ratio of from 1:2 to 20:1.

The method can be used in nitric acid production for reducing the $N_2O$ content of process gases or offgases.

23 Claims, No Drawings

METHOD OF REDUCING THE N₂O CONTENT OF GASES AND SELECTED CATALYSTS

The present invention relates to a method of reducing the N₂O content of gases using specific zeolite catalysts.

Many processes, e.g. combustion processes or the industrial preparation of nitric acid, result in an offgas laden with nitrogen monoxide NO, nitrogen dioxide $NO_2$ (collectively referred to as $NO_x$) and nitrous oxide $N_2O$. While NO and $NO_2$ have long been known as compounds having an ecotoxic relevance (acid rain, smog formation) and threshold values for maximum permissible emissions of them have been laid down worldwide, nitrous oxide has in recent years increasingly moved into the focus of environmental protection, since it contributes to a not inconsiderable extent to the degradation of stratospheric ozone and to the greenhouse effect. For reasons of environmental protection, there is therefore an urgent need for technical solutions for eliminating nitrous oxide emissions.

In contrast to the removal of $NO_x$ in offgases, which has been established in industry for many years, there are only few industrial processes for eliminating $N_2O$ and these are usually based on thermal or catalytic degradation of $N_2O$. Methods of catalytically decomposing $N_2O$ into $N_2$ and $O_2$ offer the advantage over catalytic-reductive methods that there are no operating costs for reducing agents. Methods which can be carried out at a very low temperature are likewise advantageous, since heating of the offgas streams is generally associated with a high energy consumption. An overview of catalysts which have been shown to be suitable in principle for the degradation of nitrous oxide is given by Kapteijn et al. (F. Kapteijn, et al., Appl. Cat. B: Environmental 9 (1996) 25-64). Zeolite catalysts appear to be particularly useful.

U.S. Pat. No. 5,171,553 claims zeolite catalysts of this type which are laden at least partially with metals from the group consisting of copper, cobalt, rhodium, iridium, ruthenium and platinum. However, disadvantages of these catalysts are their sometimes high price and their pronounced tendency to become deactivated in the presence of $NO_x$ or $H_2O$, which are often present together with $N_2O$ in offgases or process gases to be treated.

Fe-laden zeolite catalysts have also been examined extensively. Thus, according to Rauscher et al. (Appl. Cat. A: 184 (1999) 249-256), an 80% decrease in the $N_2O$ concentration can be brought about at 480° C. by passing an $N_2O$-containing gas stream over an Fe-ZSM-5 catalyst (an Fe-laden zeolite catalyst of the MFI type). However, such an operating temperature is not practicable for many applications, e.g. for eliminating $N_2O$ emissions in HNO3 production.

Higher degrees of removal over Fe-zeolite catalysts can be achieved when the $N_2O$-containing gas to be treated contains equivalent amounts of nitrogen monoxide (NO) which, according to Kapteijn et al. (Studies in Surface Science and Catalysis, Vol. 101 (1996) 641-650), acts as a reducing agent for $N_2O$:

$$N_2O + NO \rightarrow NO_2 + N_2$$

It is also generally known that the catalytic activity of zeolites can often be increased by dehydroxylation, i.e. by thermal elimination of water bound to the surface, or even further by dealumination, i.e. leaching of the lattice aluminum of the aluminosilicate framework of the zeolite, for example by treatment with dilute acids or with steam. This applies particularly to the catalytic reaction of hydrocarbons, as demonstrated by way of example in U.S. Pat. No. 6,165,439 or WO-A-98/07513.

The activity in the catalytic decomposition of $N_2O$ could be increased by dehydroxylation of a zeolite of the H-ZSM-5 type (Zholobenko et al. in "Proceedings of the 9th International Zeolite Conference, Montreal 1992, 299-377), while the 95% dealumination of a zeolite of the MOR type (mordenite) led to a large decrease in the decomposition activity (Slinkin et al., Kinet. Katal. (1978) 19(4), 922-927). In the case of Co- and Cu-exchanged zeolites of the ZSM-5 type which have been subjected to treatment with steam, a very nonuniform picture of $N_2O$ decomposition activity depending on the metal and the degree of exchange was found (Montes de Correa et al.; Catal. Let. 38 (1996) 27-32).

J. of Catalysis, 195, 287-297 (2000) describes steamed isomorphously substituted catalysts of the Fe-ZSM-5 type. These have iron contents of up to 0.61% by weight and are used for the catalytic oxidation of benzene to phenol.

It is an object of the present invention to provide an economical method of catalytically decomposing $N_2O$, in which the catalysts used display a high decomposition activity, i.e. high degrees of removal of $N_2O$ are achieved at low temperatures. High degrees of removal should also be achieved, in particular, in the simultaneous presence of $NO_x$.

This is achieved by the present invention which encompasses a method of reducing the content of $N_2O$ in gases by passing the $N_2O$-containing gas over a zeolite catalyst which comprises lattice aluminum (which may be partly replaced by one or more elements selected from the group consisting of B, Be, Ga, Fe, Cr, V, As, Sb and Bi together with nonlattice aluminum and, if desired, further nonlattice atoms selected from the group consisting of B, Be, Ga, Fe, Cr, V, As, Sb and Bi, has a molar ratio of nonlattice aluminum to lattice aluminum in the range from 1:2 to 20:1 and is present in the H form and/or contains exchanged iron.

Zeolites which can be used according to the invention are, in particular, zeolites of the MFI, BEA, FER or MEL types, particularly preferably those of the MFI type.

The method of the invention also encompasses the use of zeolites in which part of the lattice aluminum has been replaced by one or more elements selected from among B, Be, Ga, Fe, Cr, V, As, Sb and Bi. Also encompassed is the partial replacement of zeolites in which the lattice silicon has been replaced by one or more elements selected from among Ge, Ti, Zr and Hf. These elements may, like the aluminum, have moved from lattice positions to nonlattice positions.

Apart from the use of zeolite catalysts in the H form, the invention also encompasses the use of zeolite catalysts which are laden with iron as a result of ion exchange.

The H form of the catalysts used according to the invention is a form which is known to those skilled in the art and in which at least part of the counterions present in the zeolite are protons. The preparation of zeolites in the H form is known to those skilled in the art. Not included are zeolites which have been exchanged with metals other than iron after their hydrothermal synthesis.

Preference is given to using zeolite catalysts which have a molar ratio of nonlattice aluminum to lattice aluminum in the range from 1:1 to 15:1, particularly preferably from 3:2 to 10:1.

Particular preference is given to using zeolite catalysts which have been laden with iron. These are particularly advantageous when the $N_2O$-containing gas further comprises $NO_x$ in addition to $N_2O$. In a particular embodiment, the invention is therefore directed at gases which comprise $NO_x$ in addition to $N_2O$, in particular the processes gases or offgases from nitric acid production.

The temperature at which the $N_2O$-containing gas is passed over the zeolite catalysts to be used according to the invention is usually from 200 to 600° C., preferably from 250 to 450° C.

It has surprisingly been found that aluminosilicate zeolites in which lattice aluminum and nonlattice aluminum are present in a molar ratio of nonlattice aluminum to lattice aluminum of greater than 0.5 and less than 20, preferably less than 15, and are either present in the H form and/or have been exchanged with iron display a significantly increased activity in the decomposition of $N_2O$.

For the purposes of the invention, nonlattice aluminum encompasses all Al atoms which are not bound into the alumihosilicate lattice structure of the zeolite. Here, it is inconsequential whether this aluminum is present outside the tetrahedral oxygen matrix of the silicate as aluminum coordinated tetrahedrally, pentagonally or octahedrally by oxygen atoms. This distinction will be known to a person skilled in the art, who will know methods of analytically identifying and quantifying the individual aluminum species, for example by means of IR spectroscopy (diffuse reflection) or $^{27}Al$ NMR spectroscopy. The latter is hereby expressly incorporated by reference. An introduction to the use of these methods for differentiating lattice and nonlattice aluminum is given in "Catalysis and Zeolites: Fundamentals and Applications/J. Weitkamp, I. Puppe (eds.); Springer-Verlag Berlin Heidelberg 1990".

For the purposes of thee invention, the way in which the ratio of nonlattice aluminum to lattice aluminum according to the invention has been set is likewise inconsequential. A person skilled in the art will know methods for achieving this; such methods are described, for example, in "Catalysis and Zeolites: Fundamentals and Applications/J. Weitkamp, I. Puppe (eds.); Springer-Verlag Berlin Heidelberg 1990" in the chapter "Dealuminierung von Zeolithen".

The treatment of the zeolites for producing the catalyst to be used according to the invention usually goes beyond a simple dehydroxylation of the zeolites as is effected by simple heat treatment, for example at temperatures up to 800° C.

Particularly useful ways of setting the ratio of nonlattice aluminum to lattice aluminum according to the invention are steaming of the zeolites, i.e. hydrothermal treatment of the zeolites by passing steam over them at elevated temperatures, and also treatment with dilute acids. A combination of various methods is also possible.

Treatment with $H_2O$ vapor results, as a person skilled in the art will know, in dealumination or, if the zeolite comprises other metals such as Fe, Ga, etc. in addition to Al, demetalation making place, i.e. the aluminum or the other metals are driven from the lattice framework of the zeolite. The aluminum or the metals migrate from their lattice positions to the pores of the zeolite and remain there as amorphous constituents in oxidic or hydroxidic form as extralattice metal. The degree of dealumination or demetalation can be set via the duration of steam treatment.

The treatment of the zeolite with steam can be carried out, for example, at temperatures of 300-800° C. and for a period of 0.5-48 hours. The zeolite can be exposed to pure steam or a mixture of nitrogen and/or air and water vapor having a water vapor content of 1-100% at total pressures of up to 100 bar. If desired, a carrier gas can be added to the steam or the water vapor mixture. Suitable carrier gases are inert under the treatment conditions, and examples are $N_2$, Ar, He, $H_2$ and mixtures thereof.

The zeolites which have been steam-treated in this way can, if desired, be further dealuminated/demetalated by additional treatment with mineral acid. The acid treatment can both remove extralattice metal from the pores and lead to further demetalation of the lattice. This step can, for example, be carried out in a batch reactor at temperatures of 0-120° C. at an acid/zeolite ratio of 1-100 $cm^3/g$ and at acid concentrations of from 0.001 M to the maximum concentration of the acid. Examples of acids which can be used for this step are HCl, HF, $H_2SO_4$, HNO3 and $H_3PO_4$. After the acid treatment, the zeolite is separated off from the reaction mixture by customary methods, e.g. by filtration or centrifugation.

According to the present invention, the above-described treatment of the zeolite produces amorphous metal oxides or hydroxides at extralattice positions, which are assumed to act as catalytic centers and increase the activity for the decomposition of $N_2O$.

The structural type of the zeolites generally remains unaffected by this treatment.

Precise details of the general makeup and structure of zeolites are given in the Atlas of Zeolite Structure Types, Elsevier, 4th Revised Edition 1996, which is hereby expressly incorporated by reference.

To set the molar ratio of nonlattice aluminum to lattice aluminum according to the invention or for carrying out the method of the invention, it is possible to use, in particular, zeolites of the MFI, BEA, FER or MEL types, particularly preferably those of the MFI type. The method of the invention also encompasses zeolites in which the lattice aluminum has been partly replaced by one or more elements selected from among B, Be, Ga, Fe, Cr, V, As, Sb and Bi, i.e. has been isomorphously substituted. Isomorphous replacement of the lattice silicon by one or more elements selected from among Ge, Ti, Zr and Hf is likewise included.

The synthesis or production of zeolites can be carried out by methods known to those skilled in the art: many of the starting zeolites which can be used are commercially available from appropriate suppliers.

For the purposes of the invention, preference is given to zeolite catalysts which have the above-described molar ratio of lattice aluminum to nonlattice aluminum and which have been laden with iron by ion exchange.

The molar ratio of nonlattice aluminum to lattice aluminum according to the invention can be set before or after exchange with iron or after shaping of the catalyst and, in a particularly preferred embodiment of the invention, during the intended use itself.

The iron is preferably introduced by solid-state ion exchange. This usually starts out from commercially available ammonium zeolites (e.g. $NH_4$-ZSM-5) and appropriate iron salts (e.g. $FeSO_4.7H_2O$), which are intensively mixed by mechanical means in a ball mill at room temperature. (Turek et al.; Appl. Catal. 184, (1999) 249-256; EP-A-0 955 080). These reference are hereby expressly incorporated by reference. The catalyst powders obtained are subsequently calcined in air at temperatures in the range from 400 to 600° C. in a muffle furnace. After calcination, the iron-containing zeolites are intensively washed with distilled water, filtered off and dried. The iron content can be up to 25% based on the mass of zeolite, but is preferably from 0.1 to 10%.

The iron-laden zeolite catalysts which are obtainable by solid-state ion exchange and have the above-mentioned ratio of nonlattice aluminum to lattice aluminum display a particularly high catalytic activity and likewise form part of the subject matter of the present invention.

The invention also provides zeolite catalysts which comprise the abovementioned lattice metals, in particular lattice aluminum, together with the abovementioned nonlattice metals, in particular nonlattice aluminum, and have a molar ratio of nonlattice aluminum to lattice aluminum in the range from 1:2 to 20:1 and have been laden with iron by solid-state ion exchange.

The invention further provides zeolite catalysts which comprise both lattice aluminum (which may, if desired, have been partly replaced by one or more elements selected from the group consisting of B, Be, Ga, Fe, Cr, V, As, Sb and Bi) and nonlattice aluminum and, if desired, further nonlattice atoms selected from the group consisting of B, Be, Ga, Fe, Cr, V, As, Sb and Bi, have a molar ratio of nonlattice aluminum to lattice aluminum in the range from 1:2 to 20:1 and contain at least 1% by weight, preferably from 2 to 15% by weight, in particular from 3 to 10% by weight, of iron (calculated as $Fe_2O_3$ and based on the mass of the zeolite).

Preference is given to zeolite catalysts which are obtainable by
a) preparing a dry mixture of component 1 comprising ammonium salts, $NH_3/NH_4$-zeolites or N-containing compounds, component 2 comprising high-silicate zeolite structures having an Si/Al ratio of more than 5 and component 3 comprising an iron compound,
b) heating this mixture at temperatures above 300° C. until iron ion exchange has been completed, and
c) dealuminizing the iron-exchanged zeolite catalyst obtained in a manner known per se, for example by treatment with steam, to set a molar ratio of nonlattice aluminum to lattice aluminum in the range from 1:2 to 20:1.

The zeolites obtained can, if appropriate together with a binder or a peptizing aid or extrusion aid, be shaped to produce a suitable shape, e.g. an extrudate or a pellet. They can thus be used, as desired, as 2-4 mm extrudates, as pellets having a diameter of from 3 to 5 mm, as granules having particle sizes of from 1.0 to 1.6 mm or in powder form.

Suitable binders are, inter alia, various aluminum oxides, preferably boehmite, amorphous aluminosilicates having an $SiO_2/Al_2O_3$ ratio of from 25:75 to 90:5, preferably 75:25, silicon dioxide, preferably highly disperse $SiO_2$, mixtures of highly disperse $SiO_2$ and highly disperse $Al_2O_3$, $TiO_2$, $ZrO_2$ and also clay. The binder is usually used in a weight ratio of zeolite to binder of from 95:5 to 40:60% by weight.

Examples of extrusion aids or peptizing aids are methylcellulose, ethylcellulose, stearic acid, potato starch, formic acid, acetic acid, oxalic acid and graphite. The amount of these auxiliaries added is usually in the range from 0.1 to 10% by weight.

After shaping, the extrudates or pressed bodies are usually dried at 100-150° C. for 1-24 hours. This is usually followed by calcination at a temperature of from 400 to 650° C. for a period of from 0.25 to 24 hours. Advantageous catalysts can also be obtained when the isolated zeolites are shaped immediately after drying and subjected to calcination only after shaping.

The temperature at which the $N_2O$-containing gas is passed over the catalyst is usually between 200 and 600° C., preferably between 250 and 450° C. The gas laden with nitrogen oxides is usually passed over the catalyst at a space velocity of from 200 to 200 000 $h^{-1}$, preferably from 5 000 to 100 000 $h^{-1}$, based on the catalyst volume. The choice of operating temperature is, like the space velocity selected, determined by the desired degree of removal of $N_2O$. The method of the invention is generally carried out at a pressure in the range from 1 to 50 bar, preferably from 1 to 25 bar.

The water content of the reaction gas is preferably in the range <25% by volume, in particular in the range <15% by volume. In general, a relatively low water-concentration is preferred, since higher water contents would make higher operating temperatures necessary. The method of the invention likewise functions in the presence of $O_2$.

When using iron-containing catalysts, the simultaneous presence of $NO_x$ in the gas to be treated has been found to be particularly advantageous.

It has surprisingly been found that, in the presence of the iron-containing zeolite catalysts used according to the invention, the degree of removal of $N_2O$ is greatly increased in the presence of small amounts of $NO_x$, i.e. at a molar $NO_x/N_2O$ ratio of <0.5. This effect becomes significantly greater as the temperature increases.

This is all the more surprising since the prior art attributes the accelerated $N_2O$ degradation to the abovementioned stoichiometric reaction of $N_2O$ with NO. At sufficiently high temperature and low $NO_x/N_2O$ ratio, $NO_x$ appears to take on the role of a homogeneous cocatalyst which accelerates the degradation of $N_2O$ according to $N_2O \rightarrow N_2 + \frac{1}{2} O_2$.

In a particular embodiment, the method of the invention therefore encompasses the elimination of $N_2O$ from $NO_x$-containing gases.

In particular, it is employed for the treatment of process gases and offgases of HNO3 production and the treatment of offgases from power stations and of offgases from gas turbines in which both $N_2O$ and $NO_x$ are usually present.

In a further embodiment, the invention provides for the hydrothermal treatment of catalysts for producing the ratio according to the invention of nonlattice aluminum to lattice aluminum as intermediate process step in the elimination of $N_2O$, particularly when a decrease in the decomposition activity is observed during operation of the catalyst. Thus, the catalyst of the invention can, for example, be treated with steam during the process to restore its properties according to the invention, so that regeneration of the catalyst is effected.

In a preferred embodiment, a carbonized, deactivated zeolite catalyst can be regenerated by treatment with oxygen or $N_2O$ or a mixture thereof with or without nitrogen at a temperature of 400-650° C., preferably 450-550° C., for a period of 0.25-24 hours. The water formed during this regeneration can likewise lead to demetalation or dealumination.

The decomposition of $N_2O$ and the setting of the ratio according to the invention of nonlattice aluminum to lattice aluminum, and regeneration of the catalyst, can for the present invention be carried out in a customary reactor suitable for heterogeneous catalysis, for example in a fixed bed or a fluidized bed. As fixed-bed reactors, it is possible to use, for example, loop reactors, tray reactors and, in particular, tube reactors.

The fluidized-bed reactor, also known as the moving-bed reactor, has a reaction zone in which a bed of particulate solid is loosened by means of a gas flowing through it from below and maintained in this suspended state. This greatly loosened, gas-permeable bed is referred to as a fluidized bed. It behaves similarly to a boiling liquid with strong mixing. Fluidized material, in this case the catalyst, in extruded form with average diameters of from 80 to 250 μm has been found to be particularly advantageous for this purpose.

EXAMPLES

The following examples illustrate the invention without restricting it to them. In the examples, the steam treatment of the zeolites used was carried out in the same apparatus used for the catalytic reaction. Instead of $N_2O$, use was made of nitrogen or air which had previously been saturated with water in a saturator.

Examples 1-19

The catalytic tests of examples 1-19 described below were carried out using a fixed bed in a tube reactor having an internal diameter of 6 mm which was installed in a furnace. The reaction zone was located in the furnace which provided a uniform temperature over the entire reaction section. At the end of the reaction zone, a wire mesh prevented discharge of the catalyst grains (catalyst screen). Catalysts used were tableted or extruded shaped bodies whose mean particle sizes were between 0.5 and 5 mm. The gas leaving the reactor was collected in an air bag and analyzed by gas chromatography.

Description of the Catalysts Used

Catalyst A

The H-ZSM-5 zeolite Zeocat PZ-2/50 H, batch PZ-2/23 H ($SiO_2/Al_2O_3$=60; 0.083% by weight of $Fe_2O_3$) from Uetikon was mixed with methylcellulose as peptizing agent and water in the ratio 100:7:100 and extruded to produce extrudates having a diameter of 2 mm. After drying at 110° C./12 h and subsequent calcination at 550° C./5 h in air, the catalyst was comminuted to give grains having a diameter of 1-1.6 mm.

Catalyst B

The H-ZSM-5 zeolite KAZ 92/005H—F, M. no. KM769 ($SiO_2/Al_2O_3$=28; 0.051% by weight of $Fe_2O_3$) from Degussa AG was mixed with methylcellulose as peptizing agent and water in the ratio 100:7:100 and extruded to produce extrudates having a diameter of 2 mm. After drying at 110° C./12 h and subsequent calcination at 550° C./5 h in air, the catalyst was comminuted to give grains having a diameter of 1-1.6 mm.

Catalyst C

The H-ZSM-5 zeolite M28, KM906 ($SiO_2/Al_2O_3$=28; 0.03% by weight of $Fe_2O_3$) from Degussa AG was mixed with methylcellulose as peptizing agent and water in the ratio 100:7:100 and extruded to produce extrudates having a diameter of 2 mm. After drying at 110° C./12 h and subsequent calcination at 550° C./5 h in air, the catalyst was comminuted to give grains having a diameter of 1-1.6 mm.

Catalyst D

The H-ZSM-5 zeolite Zeocat PZ-2/54 H, batch PZ-2/23 ($SiO_2/Al_2O_3$=60; 0.045% by weight of $Fe_2O_3$) from Uetikon was mixed with methylcellulose as peptizing agent and water in the ratio 100:7:100 and extruded to produce extrudates having a diameter of 2 mm. After drying at 110° C./12 h and subsequent calcination at 550° C./5 h in air, the catalyst was comminuted to give grains having a diameter of 1-1.6 mm.

Examples 1-6

The steam treatment was carried out in the above-described tube reactor (internal diameter: 6 mm) using 3 g of the catalyst A in grain form. The catalyst was firstly dried at a temperature of 150° C. under atmospheric pressure for 1 hour in a stream of nitrogen of 16 l/h and subsequently heated to 55° C. at a heating rate of 10° C./minute. After the temperature had been reached, the nitrogen was passed through a saturator in which water was maintained at 70° C. In this way, a partial pressure of water vapor of 310 mbar was established. The degree of dealumination/demetalation was varied via the duration of the steam treatment.

After the steam treatment had been concluded, the catalyst was cooled to room temperature and 1 g was taken for analytical purposes. The remaining 2 g of catalyst were dried in the tube reactor at 350° C. overnight in a stream of $N_2O$, $N_2$ or air.

The decomposition of $N_2O$ was then carried out at a reaction temperature of 350° C. The length of the fixed bed was about 15-20 cm. The volume flow of $N_2O$ was 1 standard l/h. The samples were taken after a reaction time of 0.25 hour.

The results are shown in table 1.

TABLE 1

| Example | Calcination time [h] | Steam treatment time [h] | Ratio of nonlattice/ lattice aluminum | Conversion [%] |
|---|---|---|---|---|
| 1 | 5 | 0 | 0.4 | 15.6 |
| 2 | 5 | 1 | — | 23.2 |
| 3 | 5 | 2 | — | 31.6 |
| 4 | 5 | 3 | 1.7 | 37.2 |
| 5 | 5 | 5 | — | 39.6 |
| 6 | 5 | 7 | 2.0 | 41.1 |

Examples 7-11

The procedure of examples 1-6 was repeated using catalyst B:

TABLE 2

| Example | Calcination time [h] | Steam treatment time [h] | Conversion [%] |
|---|---|---|---|
| 7 | 5 | 0 | 26.0 |
| 8 | 5 | 1 | 48.7 |
| 9 | 5 | 3 | 62.2 |
| 10 | 5 | 7 | 74.5 |
| 11 | 5 | 13 | 89.6 |

Examples 12-14

The procedure of examples 1-6 was repeated using catalyst C:

TABLE 3

| Example | Calcination time [h] | Steam treatment time [h] | Ratio of nonlattice/ lattice aluminum | Conversion [%] |
|---|---|---|---|---|
| 12 | 5 | 0 | 0.3 | 35.4 |
| 13 | 5 | 3 | 1.9 | 63.0 |
| 14 | 5 | 4 | 2.1 | 85.2 |

Examples 15 and 16

The procedure of examples 1-6 was repeated using catalyst D:

TABLE 4

| Example | Calcination time [h] | Steam treatment time [h] | Conversion [%] |
|---|---|---|---|
| 15 | 5 | 0 | 57.0 |
| 16 | 5 | 3 | >99 |

Example 17

The procedure of Examples 1-6 was repeated using catalyst A. However, no steam treatment was carried out but instead merely a further calcination at a temperature of 550° C. in nitrogen.

TABLE 5

| Example | Calcination time [h] | Steam treatment time [h] | Conversion [%] |
|---|---|---|---|
| 1 | 5 | 0 | 15.6 |
| 17 | 5 + 15 | 0 | 14.3 |

Examples 18 and 19

The procedure of Examples 1-6 was repeated using catalyst B. However, no steam treatment was carried out but instead merely a further calcination at a temperature of 550° C. in nitrogen.

TABLE 6

| Example | Calcination time [h] | Steam treatment time [h] | Conversion [%] |
|---|---|---|---|
| 7 | 5 | 0 | 26.0 |
| 18 | 5 + 15 (in air) | 0 | 14.3 |
| 19 | 5 + 12 (in nitrogen) | 0 | 20.3 |

The results of examples 1-16 clearly show that hydrothermal treatment of the catalysts A-D to set the ratio according to the invention of nonlattice aluminum to lattice aluminum significantly increases the activity for the decomposition of $N_2O$. The increase in activity correlates with an increasing ratio of nonlattice aluminum to lattice aluminum. Furthermore, examples 17-19 show that plain calcination treatment (in addition to the calcination in the preparation of the zeolite catalysts) does not increase the conversion of $N_2O$. Setting of the ratio according to the invention of nonlattice aluminum to lattice aluminum is a prerequisite for achieving the high decomposition activity according to the invention of the catalysts.

Examples 20-23

Catalyst E

The catalyst used was an iron-laden zeolite of the ZSM-5 type.

The Fe-ZSM-5 catalyst was prepared by solid-state ion exchange starting out from a commercially available zeolite in ammonium form (ALSI-PENTA, SM27). Details of the preparation may be taken from: M. Rauscher, K. Kesore, R. Mönnig, W. Schwieger, A. Tibler, T. Turek: "Preparation of highly active Fe-ZSM-5 catalyst through solid state ion exchange for the catalytic decomposition of N2O", in Appl. Catal. 184 (1999) 249-256.

The catalyst powders were calcined in air at 823 K for 6 hours, washed and dried overnight at 383 K. After addition of appropriate binders, they were extruded to produce cylindrical catalyst bodies which were broken up to give a granular material having a grain size of 1-2 mm. The iron content of the catalyst was 7.5% by weight, calculated as $Fe_2O_3$ and based on the mass of the zeolite.

As apparatus for reducing the $N_2O$ content, a tube reactor which had an internal diameter of 20 mm and had been charged with such an amount of the above catalyst that, based on the inflowing gas stream, a space velocity of 10 000 $h^{-1}$ resulted was used in examples 20-23. The operating temperature of the reactor was set to 350° C. by heating. The gas stream entering and leaving the apparatus was analyzed by means of an FTIR gas analyzer.

The hydrothermal treatment of the catalyst E was likewise carried out in the above tube reactor by passing a stream of nitrogen containing 20% by volume of water over it at 450° C.

Examples 20 and 21

The composition of the gas mixture to be treated in examples 20 and 21 was: 1 000 ppm of $N_2O$; 2.5% by volume of $O_2$ in $N_2$.

The following results for $N_2O$ degradation were obtained (table 7):

TABLE 7

| Example | Steam treatment time [h] | Conversion [%] |
|---|---|---|
| 20 | 0 | 4 |
| 21 | 5 | 40 |

Examples 22 and 23

The composition of the gas mixture to be treated in examples 22 and 23 was: 1 000 ppm of $N_2O$; 1 000 ppm of NO, 2.5% by volume of $O_2$ in $N_2$.

The following results for $N_2O$ degradation were obtained (table 8):

TABLE 8

| Example | Steam treatment time [h] | Conversion [%] |
|---|---|---|
| 22 | 0 | 50 |
| 23 | 5 | 98 |

Examples 20 and 21 demonstrate that the high activity of the Fe-ZSM-5 catalysts used can be increased further to a significant extent by steaming.

This effect is increased further in the simultaneous presence of $NO_x$ in the offgas, as shown in examples 22 and 23.

The invention claimed is:

1. A method of reducing the content of $N_2O$ in gases which comprises passing the $N_2O$-containing gas over a zeolite catalyst which comprises lattice aluminum which is optionally partly replaced by one or more elements selected from the group consisting of B, Be, Ga, Fe, Cr, V, As, Sb and Bi, together with nonlattice aluminum and optionally further nonlattice atoms selected from the group consisting of B, Be, Ga, Fe, Cr, V, As, Sb and Bi, has a molar ratio of nonlattice aluminum to lattice aluminum in the range from 1:2 to 20:1 and is present in the H form and/or contains exchanged iron, and the reducing the $N_2O$ content by catalytically decomposing $N_2O$ into nitrogen and oxygen in the absence of reducing agents for $N_2O$.

2. The method as claimed in claim 1, wherein the zeolite catalyst or catalysts used are of the MFI, BEA, FER or MEL type.

3. The method as claimed in claim 1, wherein the zeolite catalyst or catalysts used are of the MFI type.

4. The method as claimed in claim 1, wherein the zeolite catalyst or catalysts used have a molar ratio of nonlattice aluminum to lattice aluminum in the range from 1:1 to 15:1.

5. The method as claimed in claim 1, wherein the lattice aluminum in the zeolite catalysts used has been partly replaced by one or more elements selected from the group consisting of B, Be, Ga, Fe, Cr, V, As, Sb and Bi.

6. The method as claimed in claim 1, wherein the lattice silicon in the zeolite catalysts used has been partly replaced by one or more elements selected from the group consisting of Ge, Ti, Zr and Hf.

7. The method as claimed in claim 1, wherein the zeolite catalyst used has been laden with iron by iron exchange.

8. The method as claimed in claim 1, wherein the $N_2O$-containing gas further comprises $NO_x$ in addition to $N_2O$.

9. The method as claimed in claim 8, wherein the molar ratio of $NO_x/N_2O$ is less than 0.5.

10. The method as claimed claim 1, wherein the zeolite catalyst used is treated hydrothermally in an intermediate process step to produce the ratio of nonlattice aluminum to lattice aluminum.

11. The method as claimed in claim 1, wherein the $N_2O$-containing gas is a process gas or offgas from nitric acid production.

12. The method as claimed in claim 1, wherein the $N_2O$-containing gas is an offgas from operation of a gas turbine.

13. The method as claimed in claim 1, wherein the $N_2O$-containing gas is an offgas from operation of a power station.

14. The method as claimed in claim 1, wherein the temperature at which the $N_2O$-containing gas is passed over an iron-containing zeolite catalyst is from 200 to 600° C.

15. The method as claimed in claim 1, wherein the temperature at which the $N_2O$-containing gas is passed over an iron-containing zeolite catalyst is from 250 to 450° C.

16. The method as claimed in claim 8, wherein a reducing agent for the catalytic reduction of $NO_x$ is added to the $N_2O$- and $NO_x$-containing gas.

17. A zeolite catalyst which comprises both lattice aluminum and non-lattice aluminum, has a molar ratio of non-lattice aluminum to lattice aluminum in the range from 1:2 to 20:1 and contains at least 1% by weight of iron (calculated as $Fe_2O_3$ and based on the mass of the zeolite), and the lattice aluminum of the zeolite catalyst has been partly replaced by one or more elements selected from the group consisting of B, Be, Ga, Fe, Cr, V, As, Sb and Bi and in that further non-lattice atoms selected from the group consisting of B, Be, Ga, Fe, Cr, V, As, Sb and Bi are optionally present in addition to aluminum and wherein silicon is present in the lattice aluminum and said lattice silicon present therein has been partly replaced by one or more elements selected from the group consisting of Ge, Ti, Zr and Hf.

18. The zeolite catalyst as claimed in claim 17, wherein the catalyst contains from 3 to 10% by weight of iron.

19. The zeolite catalyst as claimed in claim 17, wherein the catalyst has been laden with iron by solid state ion exchange.

20. The zeolite catalyst as claimed in claim 19, wherein the catalyst is obtainable by preparing a dry mixture of component 1 comprising ammonium salts, $NH_3/NH_4$-zeolites or N-containing compounds, component 2 comprising high-silicate zeolite structures which have an Si/Al ratio of more than 5 and in which the lattice Aluminium has been partly replaced by one or more elements selected from the group consisting of B, Be, Ga, Fe, Cr, V, As, Sb and Bi and component 3 comprising an iron compound, heating this mixture at temperatures above 300° C. until iron ion exchange has been completed, and dealuminizing the iron-exchanged zeolite catalyst to set a molar ratio of nonlattice aluminum to lattice aluminum in the range from 1:2 to 20:1.

21. The zeolite catalyst as claimed in claim 17, wherein the catalyst the zeolite is of the MFI, BEA, FER or MEL type.

22. The zeolite catalyst as claimed in claim 17, wherein the catalyst the dealumination has been carried out by treatment with steam.

23. The zeolite catalyst as claimed in claim 20, wherein the dealuminizing the iron-exchanged zeolite catalyst obtained by treatment with steam.

* * * * *